(12) United States Patent
Kim et al.

(10) Patent No.: US 8,594,123 B2
(45) Date of Patent: Nov. 26, 2013

(54) METHOD FOR DETECTING DISTRIBUTED PEER TO TRANSMIT MULTIMEDIA DATA IN WIRELESS PEER-TO-PEER NETWORK

(75) Inventors: Jong Won Kim, Gwangju (KR); Ha Young Yoon, Gwangju (KR)

(73) Assignee: ITEC Toykyo Corporation, Tokyo (JP)

(*) Notice: Subject to any disclaimer, the term of this patent is extended or adjusted under 35 U.S.C. 154(b) by 149 days.

(21) Appl. No.: 13/147,299

(22) PCT Filed: Aug. 5, 2009

(86) PCT No.: PCT/KR2009/004374
§ 371 (c)(1),
(2), (4) Date: Aug. 1, 2011

(87) PCT Pub. No.: WO2010/090381
PCT Pub. Date: Aug. 12, 2010

(65) Prior Publication Data
US 2011/0289145 A1    Nov. 24, 2011

(30) Foreign Application Priority Data

Feb. 3, 2009   (KR) .................. 10-2009-0008400

(51) Int. Cl.
*H04L 12/413* (2006.01)
(52) U.S. Cl.
USPC ........................................... 370/448
(58) Field of Classification Search
USPC .................. 370/445–448; 709/243
See application file for complete search history.

(56) References Cited

U.S. PATENT DOCUMENTS

2006/0291439 A1* 12/2006 Yang et al. .................. 370/338
2007/0014302 A1* 1/2007 Vincent ....................... 370/401
(Continued)

FOREIGN PATENT DOCUMENTS

JP     2005303998 A    5/2007
JP     2008270854 A    6/2008
(Continued)

OTHER PUBLICATIONS

Lee et al., Simulation of Slotted CSMA/CA MAC in IEEE 802.15.4 WPAN, Proceedings of the Korea Society for Simulation Conference 2005, pp. 10-14, May 2005.
Office action issued on Jan. 29, 2013 in Japanese Patent Application No. 2011-547749, 3 pages.

*Primary Examiner* — Pao Sinkantarakorn
(74) *Attorney, Agent, or Firm* — Senniger Powers LLP (57) ABSTRACT

Disclosed are a wireless peer to peer network system, a distributed peer discovering method for transmitting multimedia data in a wireless peer to peer network, and a method for responding to a request signal for requesting transmission of multimedia data in the wireless peer to peer network. An exemplary embodiment of the present invention provides a distributed peer discovering method for transmitting multimedia data in a wireless peer to peer network, the method including: transmitting a request signal including information on multimedia data to be requested by a first terminal, to neighboring terminals; when at least one second terminal having the requested multimedia data receives the request signal, determining a backoff duration in accordance with at least one of a signal to interference noise ratio of the request signal, an idle reproduction buffer capacity of the second terminal, and a remaining battery capacity of the second terminal and transmitting a response signal to the first terminal after standing by during the determined backoff duration; and transmitting a message for requesting transmission of the multimedia data to the second terminal transmitting the response signal first received by the first terminal.

10 Claims, 4 Drawing Sheets

(56) References Cited

U.S. PATENT DOCUMENTS

| | | |
|---|---|---|
| 2007/0147312 A1 | 6/2007 | Shapira |
| 2007/0184864 A1* | 8/2007 | Leitch et al. .................. 455/507 |
| 2008/0259940 A1* | 10/2008 | George et al. ................. 370/400 |
| 2009/0046570 A1* | 2/2009 | Sarkar et al. ................. 370/203 |

FOREIGN PATENT DOCUMENTS

| | | |
|---|---|---|
| KR | 20050065979 | 6/2005 |
| KR | 20050070985 | 7/2005 |
| WO | 2005057446 A1 | 6/2005 |
| WO | 2009007658 A2 | 1/2009 |

* cited by examiner

FIG.1

PRIOR ART

METHOD FOR DETECTING DISTRIBUTED PEER TO TRANSMIT MULTIMEDIA DATA IN WIRELESS PEER-TO-PEER NETWORK

TECHNICAL FIELD

The present invention relates to a wireless peer to peer network, and more particularly, to a distributed peer discovering method for transmitting multimedia data in a wireless peer to peer network.

BACKGROUND ART

Peer to peer (P2P) implies a technology that shares digital resources together through a direct exchange without a server between different devices such as a computer, and the like. A P2P service includes a file exchange, chatting such as a messenger, and the like. Wireless P2P applies the P2P technology to a wireless terminal such as a cellular phone. In a wireless P2P environment, an on-demand data distributing technology is an essential element technology in a ubiquitous environment to come up.

Figure 1:
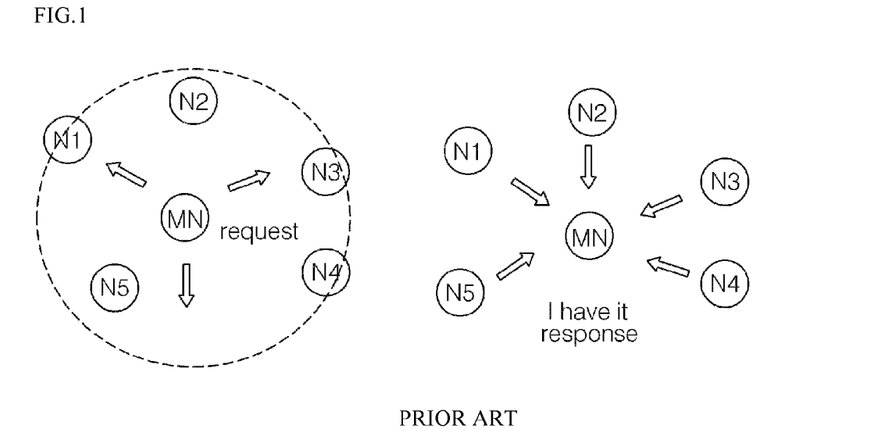
FIG. 1 is a reference diagram for schematically describing a process of discovering peer that will bring required data by using a carrier sense multiple access/collision avoidance (CSMA/CA) mechanism in a wireless peer to peer environment.

FIG. 1 is a reference diagram for schematically describing a process of discovering peer that will bring required data by using a carrier sense multiple access/collision avoidance mechanism in a wireless peer to peer environment.

A mobile node (MN) requesting data transmits a signal for requesting the corresponding data to the vicinity thereof Then, terminals which are positioned within a transmission range of the mobile node MN receive the signal and terminals N1 to N5 having the corresponding data send response signals, respectively. The mobile node MN selects a terminal sending a response signal that arrives first and receives data from the terminal The mechanism is a contention-based medium access controlling mechanism.

Meanwhile, the use of multimedia data such as a digital image, a moving picture, and the like is increased even in a wired environment and a wireless environment and an interchange need is also increased due to improvement in performance of a wireless terminal such as a cellular phone. In the case of the multimedia data, a quality of service (QoS) should be ensured and pseudo streaming that verifies or reproduces data while downloading should be supported.

DISCLOSURE

Technical Problem

According to the above mechanism, inappropriate peer may be selected. For example, since a channel state is poor, a QoS is difficult to ensure or peer of which an original function can be limited because a capacity of an idle buffer is short by transmitting data to other apparatus or peer not suitable for transmitting data to other apparatus because a remaining battery capacity is small may be selected.

Accordingly, the present invention has been made in an effort to provide a wireless peer to peer network system that ensures a QoS and considers the capacity of the idle buffer and the remaining battery capacity when transmitting multimedia data in a wireless peer to peer network, a distributed peer discovering method, and a method of responding to a request signal for requesting transmission of the multimedia data.

Technical Solution

An exemplary embodiment of the present invention provides a distributed peer discovering method for transmitting multimedia data in a wireless peer to peer network, the method including: (a) transmitting a request signal including information on multimedia data to be requested by a first terminal, to neighboring terminals; (b) when at least one second terminal having the requested multimedia data receives the request signal, determining a backoff duration in accordance with at least one of a signal to interference noise ratio of the request signal, an idle reproduction buffer capacity of the second terminal, and a remaining battery capacity of the second terminal and transmitting a response signal to the first terminal after standing by during the determined backoff duration; and (c) transmitting a message for requesting transmission of the multimedia data to the second terminal transmitting the response signal first received by the first terminal Herein, in step (b), the backoff duration may be determined to be shorter as the signal to interference noise ratio of the request signal is higher.

In step (b), the backoff duration may be determined to be shorter as the idle reproduction buffer capacity of the second terminal is higher.

In step (b), the backoff duration may be determined to be shorter as the remaining battery capacity of the second terminal is higher.

In step (b), the backoff duration may be determined by further considering at least one of the idle reproduction buffer capacity of the first terminal and the remaining battery capacity of the first terminal.

In this case, in step (a), the first terminal may transmit a parameter value on which at least one of the idle reproduction buffer capacity of the first terminal and the remaining battery capacity of the first terminal is reflected, to the neighboring terminals through the request signal, and in step (b), the backoff duration may be determined in accordance with the transmitted parameter value.

Further, in step (b), the backoff duration may be determined to be shorter as the idle reproduction buffer capacity of the first terminal is lower.

In step (b), the backoff duration may be determined to be shorter as the remaining battery capacity of the first terminal is lower.

Another exemplary embodiment of the present invention provides a method for responding to a request signal for requesting transmission of multimedia data in a wireless peer to peer network, the method including: (a) receiving, by a wireless terminal, the request signal; (b) calculating a backoff duration in accordance with at least one of a signal to interference noise ratio of the request signal, an idle reproduction buffer capacity of the wireless terminal, and a remaining battery capacity of the wireless terminal; and (c) transmitting a response signal to a request terminal transmitting the request signal after standing by during the calculated backoff duration.

Herein, in step (b), the backoff duration may be calculated to be inversely proportional to the signal to interference noise ratio of the request signal.

In addition, in step (b), the backoff duration may be calculated to be inversely proportional to the idle reproduction buffer capacity of the wireless terminal In step (b), the backoff duration may be calculated to be inversely proportional to the remaining battery capacity of the wireless terminal.

Further, the request signal may include a parameter value which is proportional to the idle reproduction buffer capacity of the request terminal or the remaining battery capacity of the request terminal, and in step (b), the backoff duration may be calculated to be proportional to the parameter value.

Yet another exemplary embodiment of the present invention provides a wireless peer to peer network system including: a first terminal transmitting a request signal including information on multimedia data to be requested, to neighboring terminals; and a second terminal having the requested multimedia data, and determining a backoff duration in accordance with at least one of a signal to interference noise ratio of the request signal, an idle buffer capacity of the second terminal, and a remaining battery capacity of the second terminal when receiving the request signal, and transmitting a response signal to the first terminal after standing by during the determined backoff duration, wherein the first terminal transmits a message for requesting transmission of the multimedia data to the second terminal transmitting the response signal first received.

Advantageous Effects

According to exemplary embodiments of the present invention, a terminal that will transmit multimedia data may be selected by ensuring a QoS and considering a capacity of an idle buffer and a remaining battery capacity when transmitting the multimedia data in a wireless peer to peer network.

BEST MODE

Hereinafter, exemplary embodiments of the present invention will be described in detail with reference to the accompanying drawings. First of all, it is to be noted that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention.

Figure 2:
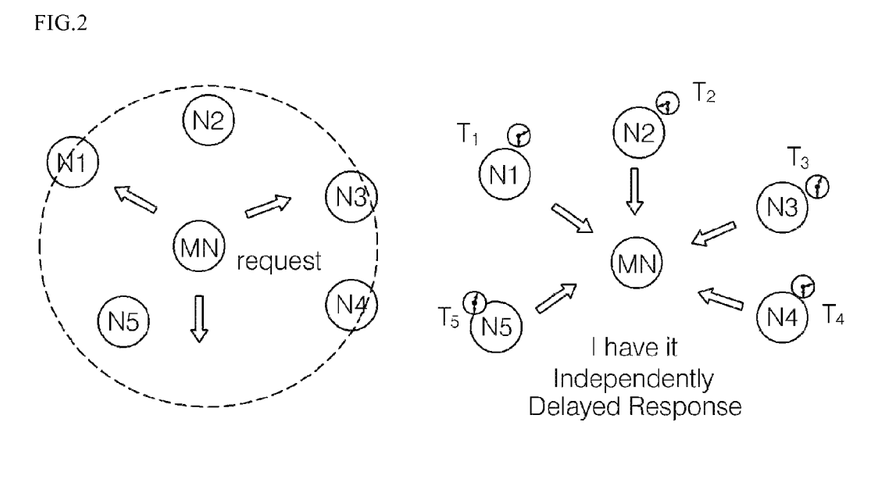
FIG. 2 is a reference diagram for describing a distributed peer discovering method in a wireless peer to peer network system according to an exemplary embodiment of the present invention.

FIG. 2 is a reference diagram for describing a distributed peer discovering method in a wireless peer to peer network system according to an exemplary embodiment of the present invention. A mobile node MN that is a terminal requesting multimedia data transmits a request signal including information on the multimedia data to be requested, to neighboring terminals. The information on the multimedia data to be requested, for example, may include a segment number of predetermined multimedia contents. In this case, the mobile node MN may broadcast the request signal to the vicinity thereof Each of the neighboring terminals includes a backoff timer and independently determines a backoff duration. Each of terminals N1 to N5 having the requested multimedia data has its own corresponding multimedia data after standing by during the independently determined backoff duration and transmits the response signal indicating that each terminal can provide the corresponding multimedia data to the mobile node MN. Thereafter, the mobile node MN sends an ACK message which is a message for requesting transmission of the multimedia data, to a terminal that transmits a firstly received response signal, and as a result, the node and the terminal are connected to each other, thereby downloading the multimedia data from the terminal.

Hereinafter, a mechanism in which the terminals N1 to N5 determine the backoff durations will be described. In the following description, the terminal requesting the multimedia data will be called a "request terminal" and a terminal responding thereto will be called a "response terminal".

The backoff duration Tn of each of the response terminals N1 to N5 is first determined according to a signal to interference noise ratio of the request signal. The higher the signal to interference noise ratio is, the better the QoS of the transmitted data is, and as a result, the mobile node MN should be able to select a terminal having the higher signal to interference noise ratio. Therefore, in the exemplary embodiment, the backoff duration is determined to be shorter as the signal to interference noise ratio of the request signal is higher in each response terminal Nn.

Second, the backoff duration Tn is determined according to an idle reproduction buffer capacity of the response terminal Nn. Even though each response terminal Nn provides its own multimedia data to the request terminal MN, each response terminal Nn should not be subjected to restriction in a service which each response terminal Nn intends to arbitrarily provide, e.g., a function to arbitrarily reproduce the multimedia data. Therefore, the mobile node MN should be able to select a terminal having the higher idle reproduction buffer capacity. In the exemplary embodiment, the backoff duration is determined to be shorter as the idle reproduction buffer capacity is higher in each response terminal Nn.

Third, the backoff duration Tn is determined according to a remaining battery capacity of each response terminal Nn. In order to transmit the multimedia data to other terminals, battery consumption cannot help increasing. Therefore, when the remaining battery capacity is not sufficient, no requested data may be transmitted or even though all the requested data can be transmitted, a battery is significantly consumed, and as a result, the terminal is subjected to restriction in arbitrarily providing the service. Accordingly, the request terminal MN should be able to select a response terminal having the higher remaining battery capacity. In the exemplary embodiment, the backoff duration is determined to be shorter as the remaining battery capacity is higher in each response terminal Nn.

The backoff duration may be determined according to only one or two of the three factors. For example, in general, under an environment in which the battery capacity is sufficient, the backoff duration may be determined by considering both the signal to interference noise ratio and the idle reproduction buffer capacity. In the exemplary embodiment, a function for determining the backoff duration will be referred to as a score function. When a signal to interference noise ratio of a request signal transmitted from the request terminal Mn to an n-th response terminal $N_n$ is represented by $SINR^n_{req}$ and an idle buffer capacity and a remaining battery capacity of the n-th response terminal $N_n$ are represented by $L^n_{buffer}$ and $T^n_{battery}$, the score function can be represented by $f(SINR^n_{req}, L^n_{buffer}, T^n_{battery})$ and the relationship thereof can be expressed as Equation 1 below. That is, the score function is calculated to be in inverse proportion to each of $SINR^n_{req}$, $L^n_{buffer}$, and $T^n_{battery}$.

$$f(SINR^n_{req}, L^n_{buffer}, T^n_{battery}) \sim 1/SINR^n_{req}$$

$$f(SINR^n_{req}, L^n_{buffer}, T^n_{battery}) \sim 1/L^n_{buffer}$$

$$f(SINR^n_{req}, L^n_{buffer}, T^n_{battery}) \sim 1/T^n_{battery} \quad \text{[Equation 1]}$$

When the backoff duration is determined to be proportional to the score function, the request terminal MN selects a response terminal having the higher signal to interference noise ratio, the higher idle reproduction buffer capacity, and the higher remaining battery capacity as a terminal capable of downloading the multimedia data. Moreover, an additional overhead does not occur on the network and the conventional concept of selecting a terminal transmitting the response signal that arrives first can be applied as it is.

Meanwhile, pairs of terminals that intend to transmit and receive the multimedia data in the wireless peer to peer network may be multiple. When both terminals intend to download data in a limited channel at a similar time, the priority needs to be appropriately selected. When the idle reproduction buffer capacity is lower in pseudo streaming, a reproducible time becomes short without additional downloading. Therefore, the terminal needs to use a resource first of all for smooth reproduction. In the exemplary embodiment, as the idle production buffer capacity of the terminal requesting the multimedia data is lower, the backoff duration of a terminal responding thereto is determined to be shorter to allow a terminal having the lower idle reproduction buffer capacity to download the data first of all. To this end, in the exemplary embodiment, when the terminal requesting the multimedia data broadcasts the request signal, the corresponding terminal transmits a parameter value on which its own idle reproduction buffer capacity is reflected, through the request signal.

Figure 3:
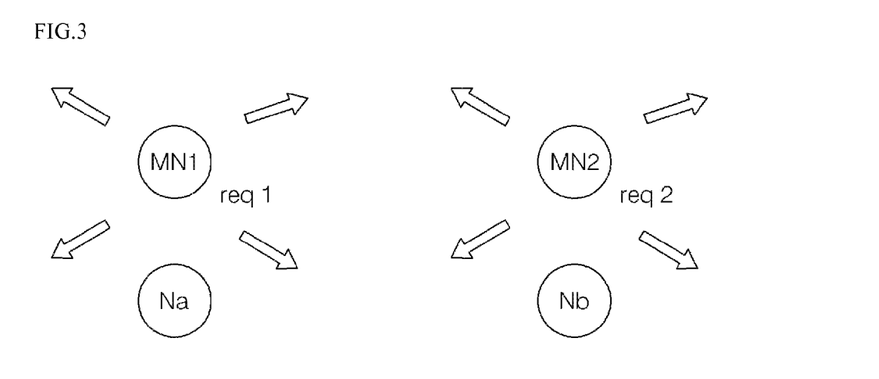
FIG. 3 is a reference diagram for describing a distributed peer discovering method of two mobile nodes in a wireless peer to peer network system according to an exemplary embodiment of the present invention.

Referring to FIG. 3, it is assumed that a mobile node MN1 and a mobile node MN2 broadcast a request signal 1 and a request signal 2, respectively and MN1 is lower than MN2 in the idle buffer capacity. In addition, it is assumed that a terminal Na responds to the request signal 1 and a terminal Nb responds to the request signal 2 to transmit the response signal. According to the exemplary embodiment, since MN1 is lower than MN2 in the idle buffer capacity, a backoff duration of the terminal Na is determined to be shorter than that of the terminal Nb to transmit the response signal of the terminal Na to the mobile node MN1 first of all, and as a result, data is first transmitted and received between the terminal Na and the mobile node MN1.

Furthermore, even in the case where both terminals requesting the multimedia data have different remaining battery capacities, the priority thereof needs to be appropriately selected. In this case, the priority needs to be given to a terminal having a low remaining battery capacity. The reason is that a terminal in which a battery time remains little needs to provide the service first of all. In the exemplary embodiment, as the remaining battery capacity of the terminal requesting the multimedia data is lower, the backoff duration of a terminal responding thereto is determined to be shorter to allow a terminal having the lower remaining battery capacity to download the data first of all. To this end, in the exemplary embodiment, when the terminal requesting the multimedia data broadcasts the request signal, the corresponding terminal transmits a parameter value on which its own idle reproduction buffer capacity is reflected, through the request signal in addition to the idle reproduction buffer capacity.

When the idle reproduction buffer capacity and the remaining battery capacity of the request terminal are represented by L and T, respectively and the parameter value on which the idle reproduction buffer capacity and the remaining battery capacity to be transmitted through the request signal are reflected is represented by $T_{req}$, $T_{req}$ may be represented by $f(L, T)$ and the relationship thereof can be expressed as Equation 2 below. That is, the parameter $T_{req}$ is calculated to be proportional to L and T.

$$T_{req} = f(L, T) \sim L$$

$$T_{req} = f(L, T) \sim T \quad \text{[Equation 2]}$$

When the value of the score function is represented by $N_{score}$, a backoff duration $BD_n$ of an n-th response terminal can be determined as shown in Equation 3 by reflecting $T_{req}$ together.

$$BD_n = N_{score} * T_{req} * SlotT \quad \text{[Equation 3]}$$

$N_{score}$ is a value arbitrarily calculated in the response terminal and Treq is a value which the response terminal receives from the request terminal through the request signal. In Equation 3, $N_{score} * T_{req}$ is determined as an integer between 0 and a value of a competition window (CW), and SlotT is as a global variable and SlotT may be MAC_SlotTime*$CW_{max}$[V0]. Herein, MAC_SlotTime is a slot time defined in the IEEE 802.11 PHYs standard and $CW_{max}$[V0] is the maximum competition window value of AC-V0 in IEEE 802.11e.

Figure 4:
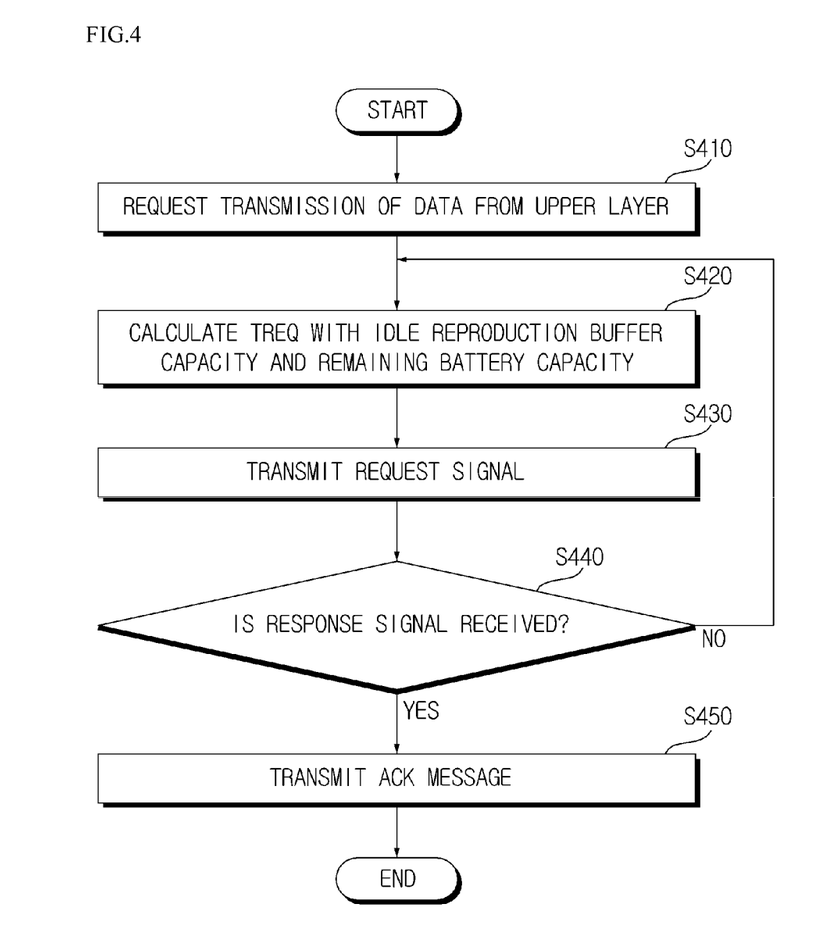
FIG. 4 is a flowchart showing a process of discovering peer in a request terminal and requesting multimedia data according to an exemplary embodiment of the present invention.
Figure 5:
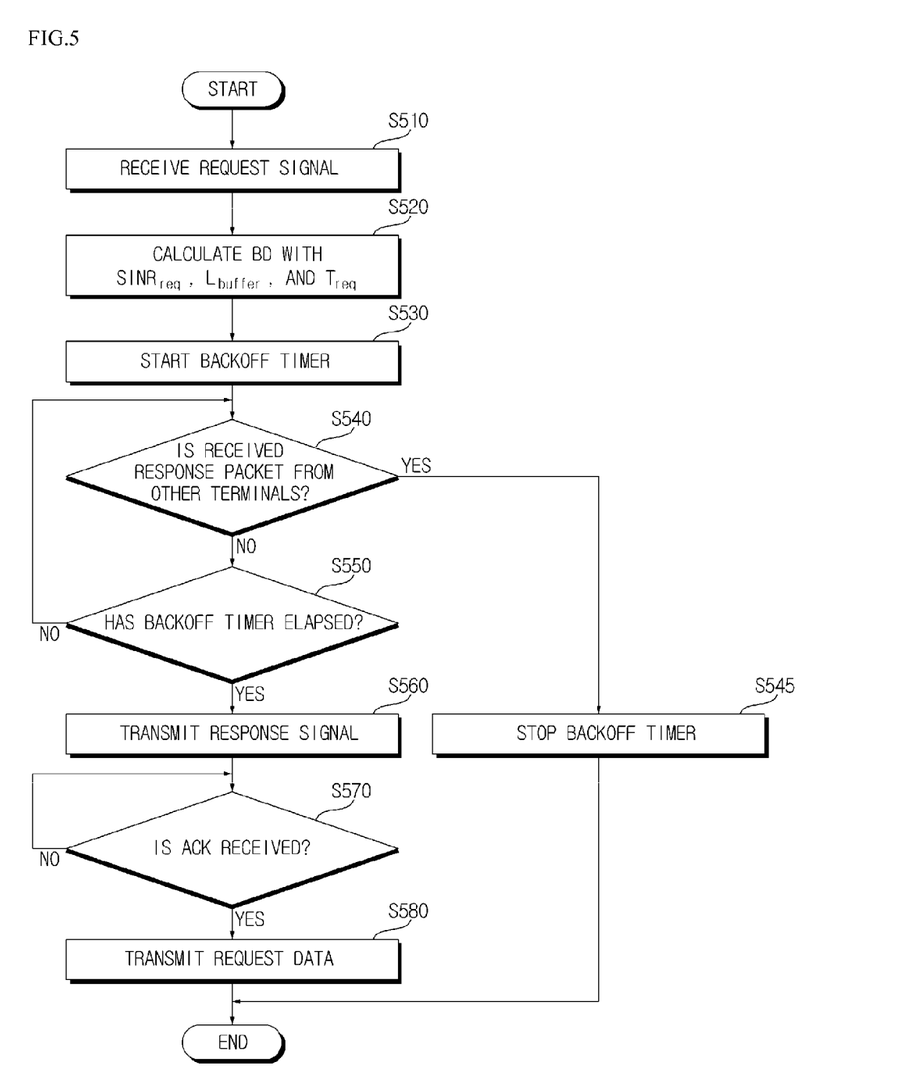
FIG. 5 is a flowchart showing a process of responding to a request signal in a response terminal and providing multimedia data according to an exemplary embodiment of the present invention.

FIG. 4 is a flowchart showing a process of discovering peer in a request terminal and requesting multimedia data according to an exemplary embodiment of the present invention and FIG. 5 is a flowchart showing a process of responding to a request signal in a response terminal and providing multimedia data according to an exemplary embodiment of the present invention. The processes according to the exemplary embodiment may be performed in a media access control layer (MAC).

Referring to FIG. 4, an operation of the request terminal will be described.

When a transmission request (e.g., a segment number of predetermined multimedia contents) of data is received from an upper layer (step S410), an idle reproduction buffer capacity and a remaining battery capacity are checked and $T_{req}$ is calculated based on the values (step S420). As described above, $T_{req}$ is determined as a large value as the idle reproduction buffer capacity and the remaining battery capacity are large.

In addition, the request signal including the segment number which is information on multimedia data to be requested and the calculated $T_{req}$ value is transmitted in a broadcast mechanism (step S430). Thereafter, it is checked whether a response signal is received (step S440) and if the response signal is received even after a predetermined time elapsed, the process returns to step S420 again and steps S420 and S430 are repeated.

If the response signal is received, an ACK message for requesting transmission of data is transmitted to a terminal that transmits the response signal (step S450).

Referring to FIG. 5, an operation of the response terminal will be described.

When the request signal is received from the request terminal (step S510), a backoff duration is calculated with the $T_{req}$ value included in the request signal, a signal to interference noise ratio of the request signal $SINR_{req}$, an idle reproduction buffer capacity $L_{buffer}$, and a remaining battery capacity $T_{req}$ (step S520) and a backoff timer incorporated in the response terminal is started (step S530). When the response signal for responding to the request signal is received from other terminals before the backoff duration elapsed (step S540), the other terminal responds first, and as a result, the backoff timer stops (step S545) and the process ends. When the backoff timer operates during the calculated backoff duration (step S550), the response signal for responding to the request signal is transmitted to the request terminal (step S560). When the request terminal transmits the ACK message for requesting transmission of data and the response terminal receives the ACK message (step S570), the requested data is transmitted to the request terminal (step S580).

Figure 6:
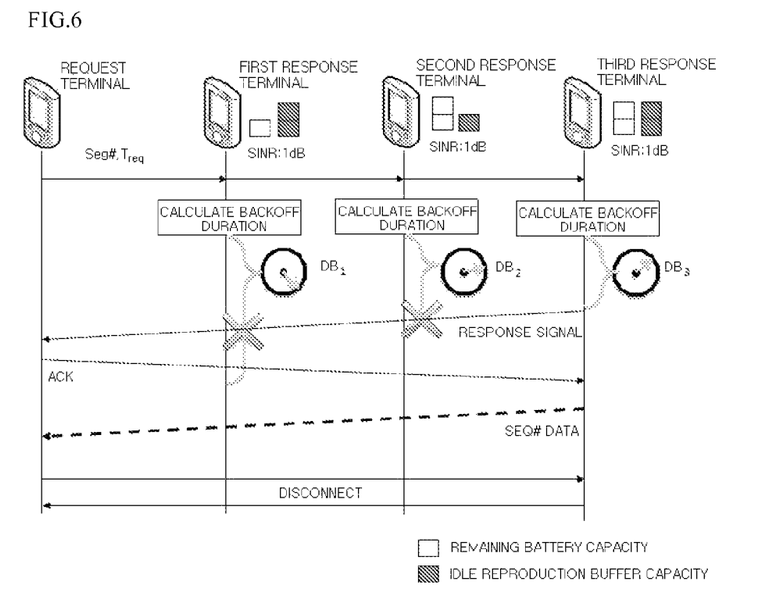
FIG. 6 is one example of a timeline between one request terminal and three response terminals.

FIG. 6 is one example of a timeline between one request terminal and three response terminals and shows a case in which the three response terminals are different from each other in the idle reproduction buffer capacity and remaining battery capacity.

The segment number of the data which the request terminal will request and the Treq value are transmitted to neighboring terminals through the request signal. Referring to FIG. 6, first to three response terminals are the same as each other as 1 dB in the signal to interference noise ratio of the request signal, the second and third response terminals are the largest in the remaining battery capacity, and the first and third response terminals are the largest in the idle reproduction buffer capacity. Therefore, in the case of the backoff duration calculated in each response terminal, the backoff duration of the third response terminal is calculated to be shortest, and as a result, the backoff timer is set as shown in the figure. Therefore, the third response terminal in which the backoff duration is set to the shortest value transmits the response signal to the request terminal first of all. The response signal is received even by the first response terminal and the second response terminal and since both terminals received the response signal before the backoff duration elapsed, the backoff timer stops and there is no response. The request terminal receiving the response signal from the third response terminal transmits the ACK message. The third response terminal receiving the ACK message synchronizes with the request terminal and thereafter, transmits data to the request terminal When transmission of data is completed, the third response terminal and the request terminal exchange a message to be disconnected from each other.

Figure 7:
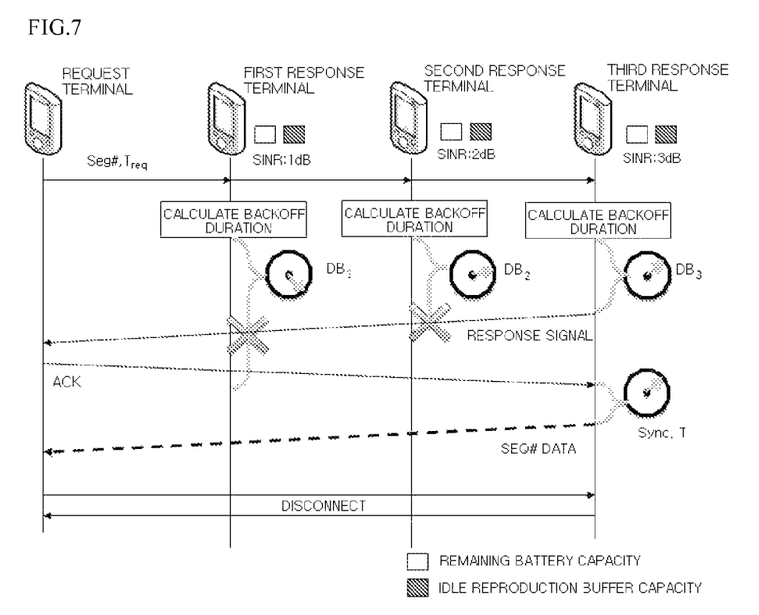
FIG. 7 is another example of a timeline between one request terminal and three response terminals.

FIG. 7 is another example of a timeline between one request terminal and three response terminals and shows a case in which the three response terminals are the same as each other in the idle reproduction buffer capacity and remaining batter capacity and different from each other in the signal to interference noise ratio. In the shown example, since the signal to interference noise ratio of the third response terminal is the highest as 3 dB, the backoff duration calculated in each response terminal is the shortest in the third response terminal. Accordingly, the third response terminal transmits the response signal to the request terminal first of all and the rest of the operations thereof is the same as FIG. 6 and will be omitted.

Meanwhile, the exemplary embodiments of the present invention can be prepared by a program which is executable in a computer and implemented in a general purpose digital computer operating the program by using a computer readable recording medium. The computer readable recording medium includes magnetic storage media (e.g., a ROM, a floppy disk, a hard disk, and the like), optical reading media (e.g., a CD-ROM, a DVD, and the like), and a storage medium such as a carrier wave (e.g., transmission through the Internet).

The spirit of the present invention has just been exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

The invention claimed is:

1. A distributed peer discovering method for transmitting multimedia data in a wireless peer to peer network, the method comprising:
   (a) transmitting a request signal including information on multimedia data to be requested by a first terminal, to neighboring terminals, wherein the first terminal transmits a parameter value reflected on which at least one of an idle reproduction buffer capacity of the first terminal and a remaining battery capacity of the first terminal is reflected, to the neighboring terminals through the request signal;
   (b) when at least one second terminal having the requested multimedia data receives the request signal, determining a backoff duration in accordance with at least one of a signal to interference noise ratio of the request signal, an idle reproduction buffer capacity of the second terminal, and a remaining battery capacity of the second terminal and transmitting a response signal to the first terminal after standing by during the determined backoff duration, wherein the backoff duration is determined by further considering at least one of the idle reproduction buffer capacity of the first terminal and the remaining battery capacity of the first terminal, and wherein the backoff duration is determined in accordance with the transmitted parameter value; and
   (c) transmitting a message for requesting transmission of the multimedia data to the second terminal transmitting the response signal first received by the first terminal.

2. The distributed peer discovering method of claim 1, wherein in step (b), the backoff duration is determined to be shorter as the signal to interference noise ratio of the request signal is higher.

3. The distributed peer discovering method of claim 1, wherein in step (b), the backoff duration is determined to be shorter as the idle reproduction buffer capacity of the second terminal is higher.

4. The distributed peer discovering method of claim 1, wherein in step (b), the backoff duration is determined to be shorter as the remaining battery capacity of the second terminal is higher.

5. The distributed peer discovering method of claim 1, wherein in step (b), the backoff duration is determined to be shorter as the idle reproduction buffer capacity of the first terminal is lower.

6. The distributed peer discovering method of claim 1, wherein in step (b), the backoff duration is determined to be shorter as the remaining battery capacity of the first terminal is lower.

7. A method for responding to a request signal for requesting transmission of multimedia data in a wireless peer to peer network, the method comprising:
(a) receiving, by a wireless terminal, the request signal;
(b) calculating a backoff duration in accordance with at least one of a signal to interference noise ratio of the request signal, an idle reproduction buffer capacity of the wireless terminal, and a remaining battery capacity of the wireless terminal; and
(c) transmitting a response signal to a request terminal transmitting the request signal after standing by during the calculated backoff duration, wherein the request signal includes a parameter value which is proportional to the idle reproduction buffer capacity of the request terminal or the remaining battery capacity of the request terminal, and wherein the backoff duration is calculated to be proportional to the parameter value.

8. The responding method of claim 7, wherein in step (b), the backoff duration is calculated to be inversely proportional to the signal to interference noise ratio of the request signal.

9. The responding method of claim 7, wherein in step (b), the backoff duration is calculated to be inversely proportional to the idle reproduction buffer capacity of the wireless terminal.

10. The responding method of claim 7, wherein in step (b), the backoff duration is calculated to be inversely proportional to the remaining battery capacity of the wireless terminal.

\* \* \* \* \*